(12) United States Patent
Masuhara et al.

(10) Patent No.: US 10,253,140 B2
(45) Date of Patent: Apr. 9, 2019

(54) POLYROTAXANE-CONTAINING COMPOSITION

(71) Applicants: SUMITOMO SEIKA CHEMICALS CO., LTD., Kako-gun, Hyogo (JP); ADVANCED SOFTMATERIALS INC., Kashiwa-shi, Chiba (JP)

(72) Inventors: Yusaku Masuhara, Hyogo (JP); Naoki Sainou, Hyogo (JP); Naoyuki Hashimoto, Chiba (JP)

(73) Assignees: Sumitomo Seika Chemicals Co., Ltd., Hyogo (JP); Advanced Softmaterials Inc., Chiba (JP)

( * ) Notice: Subject to any disclaimer, the term of this patent is extended or adjusted under 35 U.S.C. 154(b) by 0 days.

(21) Appl. No.: 15/022,482

(22) PCT Filed: Oct. 6, 2014

(86) PCT No.: PCT/JP2014/076692
§ 371 (c)(1),
(2) Date: Mar. 16, 2016

(87) PCT Pub. No.: WO2015/064308
PCT Pub. Date: May 7, 2015

(65) Prior Publication Data
US 2016/0229963 A1    Aug. 11, 2016

(30) Foreign Application Priority Data

Oct. 31, 2013  (JP) ................................ 2013-226886

(51) Int. Cl.
*C08G 83/00*    (2006.01)
*C08B 37/16*    (2006.01)
*C08L 5/16*    (2006.01)
*C09J 133/10*    (2006.01)
*C09J 105/16*    (2006.01)
*C08G 65/329*    (2006.01)
*C08L 71/02*    (2006.01)

(52) U.S. Cl.
CPC ........ *C08G 83/007* (2013.01); *C08B 37/0012* (2013.01); *C08B 37/0015* (2013.01); *C08G 65/329* (2013.01); *C08L 5/16* (2013.01); *C08L 71/02* (2013.01); *C09J 105/16* (2013.01); *C09J 133/10* (2013.01); *C08G 2170/40* (2013.01)

(58) Field of Classification Search
CPC .............. C08G 83/007; C08G 2170/40; C08B 37/0015; C09J 105/16
USPC ........................................................ 536/103
See application file for complete search history.

(56) References Cited

U.S. PATENT DOCUMENTS

| | | |
|---|---|---|
| 2008/0097039 A1 | 4/2008 | Ito et al. |
| 2009/0030108 A1 | 1/2009 | Ito et al. |
| 2009/0047532 A1 | 2/2009 | Ito et al. |
| 2009/0062467 A1 | 3/2009 | Arai et al. |
| 2009/0213462 A1* | 8/2009 | Wakizaka ................ G02B 1/11 359/580 |
| 2009/0214871 A1 | 8/2009 | Fukuda et al. |
| 2009/0214872 A1 | 8/2009 | Minami-Ashigara-shi et al. |
| 2009/0215919 A1 | 8/2009 | Ito et al. |
| 2011/0105688 A1 | 5/2011 | Ruslim et al. |
| 2011/0118376 A1 | 5/2011 | Hayashi et al. |
| 2011/0256393 A1* | 10/2011 | Arai .................. C08G 18/4072 428/352 |
| 2011/0319527 A1 | 12/2011 | Suzuki et al. |
| 2012/0316278 A1 | 12/2012 | Inoue et al. |
| 2014/0066403 A1 | 3/2014 | Yamasaki et al. |

FOREIGN PATENT DOCUMENTS

| | | |
|---|---|---|
| CN | 101278020 | 10/2008 |
| CN | 101287775 | 10/2008 |
| CN | 101405361 | 4/2009 |
| CN | 102245728 | 11/2011 |
| CN | 102317384 | 1/2012 |
| EP | 1 734 066 | 12/2006 |
| EP | 1 900 776 | 3/2008 |
| EP | 2 174 960 | 4/2010 |
| JP | 2009-120759 A | 6/2009 |
| JP | 2009-204832 A | 9/2009 |
| JP | 2010-138258 A | 6/2010 |
| JP | 2011-046917 | 3/2011 |
| JP | 2011-241401 A | 12/2011 |
| JP | 2012-144591 A | 8/2012 |
| KR | 10-1295325 | 8/2013 |

(Continued)

OTHER PUBLICATIONS

International Search Report issued in PCT/JP2014/076692 dated Oct. 28, 2014 (2 pages).

(Continued)

*Primary Examiner* — Eric Olson
*Assistant Examiner* — Michael C. Henry
(74) *Attorney, Agent, or Firm* — Hamre, Schumann, Mueller & Larson, P.C.

(57) ABSTRACT

The present invention aims to provide a polyrotaxane-containing composition having excellent transparency.

The present invention relates to a polyrotaxane-containing composition including: a polyrotaxane that has a cyclic molecule, a linear molecule threading through a cavity of the cyclic molecule in a skewered manner, and capping groups capping both ends of the linear molecule; and an alkyl (meth) acrylate that has a C4-C18 alkyl group, the polyrotaxane having at least one cyclic molecule that has a C4-C18 alkyl group.

3 Claims, No Drawings

(56) References Cited

FOREIGN PATENT DOCUMENTS

| | | |
|---|---|---|
| WO | 2006/088200 | 8/2006 |
| WO | 2006/115255 | 11/2006 |
| WO | 2009/145073 A1 | 12/2009 |
| WO | 2012/124220 A1 | 9/2012 |
| WO | 2012/165401 | 12/2012 |

OTHER PUBLICATIONS

Chang Guan Jun, "Viscoelastic Damping Materials (Chinese Edition)", published by guo fang gong ye chu ban she, Dec. 2012, pp. 193-194.

* cited by examiner

POLYROTAXANE-CONTAINING COMPOSITION

TECHNICAL FIELD

The present invention relates to a polyrotaxane-containing composition.

BACKGROUND ART

Polyrotaxanes including a cyclic molecule, a linear molecule threading through a cavity of the cyclic molecule in a skewered manner, and capping groups capping both ends of the linear molecule are expected to have applications in various fields because of their specific viscoelastic characteristics. Use of polyrotaxanes as crosslinking agents is considered in order to impart their specific viscoelastic characteristics to materials.

As a material in which a polyrotaxane is used as a crosslinking agent, Patent Literature 1 discloses a urethane elastomer with a small permanent strain, low stress relaxation properties, and a low hysteresis loss.

Patent Literature 2 discloses a pressure-sensitive adhesive having both high stress relaxation properties and a high holding power which are achieved by crosslinking a (meth) acrylic acid ester copolymer having a hydroxy group with a polyrotaxane.

CITATION LIST

Patent Literature

Patent Literature 1: JP 2011-241401 A
Patent Literature 2: JP 2010-138258 A

SUMMARY OF INVENTION

Technical Problem

The material disclosed in Patent Literature 1 is a thermosetting urethane elastomer that has problems in transparency and weather resistance to have limited applications. In the case of the pressure-sensitive adhesive disclosed in Patent Literature 2, a solvent needs to be used for mixing a (meth) acrylic acid ester copolymer, a polyrotaxane, and a crosslinking agent, which requires a drying step for removing the solvent after formation of a film.

As materials excellent in transparency, long-chain alkyl (meth)acrylates are favorably used for transparent pressure-sensitive adhesives, for example. If a long-chain alkyl (meth) acrylate is mixed with a polyrotaxane, however, the composition may become turbid.

The present invention aims to provide a polyrotaxane-containing composition having excellent transparency.

Solution to Problem

The present invention relates to a polyrotaxane-containing composition including: a polyrotaxane that has a cyclic molecule, a linear molecule threading through a cavity of the cyclic molecule in a skewered manner, and capping groups capping both ends of the linear molecule; and an alkyl (meth)acrylate that has a C4-C18 alkyl group, the polyrotaxane having at least one cyclic molecule that has a C4-C18 alkyl group.

The present invention is specifically described in the following.

The present inventors considered that the cause of turbidity of the composition in the case of using a polyrotaxane as a crosslinking agent for a long-chain alkyl (meth)acrylate is poor compatibility of the polyrotaxane with the long-chain alkyl (meth)acrylate having high hydrophobicity, which fails to give a homogeneous solution.

The present inventors found out that introduction of a C4-C18 alkyl group into a cyclic molecule of a polyrotaxane can improve the compatibility of the polyrotaxane with a long-chain alkyl (meth) acrylate to provide a composition having excellent transparency, thereby completing the present invention.

The polyrotaxane-containing composition of the present invention contains a polyrotaxane that includes a cyclic molecule, a linear molecule threading through a cavity of the cyclic molecule in a skewered manner, and capping groups capping both ends of the linear molecule.

The polyrotaxane has at least one cyclic molecule that has a C4-C18 alkyl group.

The cyclic molecule is not particularly limited as long as it can include a linear molecule threading through a cavity of the cyclic molecule in a skewered manner and can move along the linear molecule.

As a method for including the linear molecule in the cyclic molecule, a conventionally known method (e.g., method disclosed in JP-A 2005-154675) may be employed.

The word "cyclic" of the cyclic molecule as used herein refers to a state of being substantially cyclic. As long as the molecule can move along the linear molecule, the cyclic molecule does not need to have a completely closed ring structure and may have, for example, a helical structure.

Examples of the cyclic molecule include cyclic polymers such as cyclic polyethers, cyclic polyesters, and cyclic polyether amines, and cyclodextrins.

Examples of the cyclic polymers include crown ethers and derivatives thereof, calixarenes and derivatives thereof, cyclophanes and derivatives thereof, and cryptands and derivatives thereof.

Though the cyclic molecule is appropriately selected depending on the kind of the linear molecule to be used, preferred are cyclodextrins such as α-cyclodextrin, β-cyclodextrin, and γ-cyclodextrin because they are readily available and many kinds of capping groups can be used. For example, as described later, in the case where polyethylene glycol is selected as a linear molecule, preferred is α-cyclodextrin in terms of the stability of the inclusion complex to be obtained.

In the polyrotaxane, at least one cyclic molecule needs to have a C4-C18 alkyl group. In the case where a cyclodextrin is used as the cyclic molecule, the hydroxy groups of the cyclodextrin may be partially substituted with a substituent group that can impart solubility of the polyrotaxane to various solvents (hereafter, also referred to as a "solubility-imparting group"). Examples of the solubility-imparting group include an acetyl group, a trityl group, a trimethylsilyl group, a phenyl group, a polyester chain, an oxyethylene chain, and a polyacrylic acid ester chain. These solubility-imparting groups may be introduced alone, or in combination of two or more thereof. When two or more kinds of solubility-imparting groups are introduced, for example, when an oxyethylene chain and a polyester chain are introduced, a hydroxy group of the cyclodextrin is first substituted with an oxyethylene chain, and a polyester chain is introduced from the hydroxy group at an end of the introduced oxyethylene chain. Alternatively, after addition of a hydroxypropyl group to a hydroxy group present in the cyclodextrin itself, ring-opening polymerization of ε-caprolactone is carried out via a hydroxy group of the hydroxypropyl group so that a polycaprolactone (polyester) chain is introduced.

The introduction rate (substitution degree) of these solubility-imparting groups is preferably 10 to 90%, more preferably 30 to 70% relative to the hydroxy groups of the cyclodextrin.

In the present invention, introduction of a C4-C18 alkyl group into the cyclic molecule allows the polyrotaxane to have excellent compatibility with the alkyl (meth) acrylate that has a C4-C18 alkyl group.

The C4-C18 alkyl group in at least one cyclic molecule may be directly introduced to a reaction point of the cyclic molecule, such as a hydroxy group of a cyclodextrin. Alternatively, after addition of a hydroxypropyl group to a terminal reaction point of the solubility-imparting group, such as a hydroxy group of a cyclodextrin, ring-opening polymerization of ε-caprolactone may be carried out via a hydroxy group of the hydroxypropyl group for introduction of a polycaprolactone (polyester) chain. Then, the C4-C18 alkyl group may be introduced to a terminal hydroxy group of the formed polycaprolactone chain. The latter method is preferred in terms of the compatibility with an alkyl (meth) acrylate that has a C4-C18 alkyl group.

The C4-C18 alkyl group in at least one cyclic molecule may be linear or branched, and is preferably linear.

Examples of the C4-C18 alkyl group in at least one cyclic molecule include a n-butyl group, a t-butyl group, a n-hexyl group, a cyclohexyl group, a n-octyl group, and an octadecyl group. Preferred among these are C4-C10 alkyl groups, and more preferred are a n-butyl group, a n-hexyl group, and a n-octyl group in terms of the availability of raw materials.

The lower limit of the introduction rate of the C4-C18 alkyl group in the polyrotaxane is preferably 10%. The introduction rate of the C4-C18 alkyl group of 10% or higher can ensure the sufficient compatibility with an alkyl (meth) acrylate that has a C4-C18 alkyl group. The lower limit of the introduction rate of the C4-C18 alkyl group is more preferably 20%, still more preferably 30%. A higher introduction rate of the C4-C18 alkyl group is preferred. The substantial upper limit thereof is 90%.

The introduction rate of a C4-C18 alkyl group herein is a value calculated by the following method, unless otherwise specified. A description is given on a case where the cyclic molecule is a cyclodextrin. (Case where C4-C18 alkyl group is directly introduced to hydroxy group of cyclodextrin or case where solubility-imparting group preliminary introduced into cyclodextrin has hydroxy group)

The introduction rate can be obtained in conformity with "JIS K 0070" using the following equation where A1 (mol) represents the amount of substance of hydroxy groups per mole of a polyrotaxane obtained based on the hydroxy value of the polyrotaxane before introduction of an alkyl group and A2 (mol) represents the amount of substance of hydroxy groups per mole of the polyrotaxane obtained based on the hydroxy value of the polyrotaxane after introduction of an alkyl group:

Introduction rate of alkyl group (%)=$\{(A1-A2)/A1\}\times 100$.

(Case where solubility-imparting group preliminary introduced into cyclodextrin has no hydroxy group)

The introduction rate can be obtained in conformity with "JIS K 0070" using the following equation where A3 (mol) represents the amount of substance of hydroxy groups per mole of a polyrotaxane obtained based on the hydroxy value of the polyrotaxane before introduction of a solubility-imparting group, A4 (mol) represents the amount of substance of hydroxy groups per mole of a polyrotaxane obtained based on the hydroxy value of the polyrotaxane after introduction of a solubility-imparting group, and A5 (mol) represents the amount of substance of hydroxy groups per mole of a polyrotaxane obtained based on the hydroxy value of the polyrotaxane after introduction of an alkyl group:

Introduction rate of alkyl group (%)=$\{(A4-A5)/A3\}\times 100$.

In the case where the reaction point to which a substituent group is introduced is not a hydroxy group (e.g., case where the cyclic molecule is not a cyclodextrin), the introduction rate of an alkyl group can be calculated in the same manner as the method described above by obtaining the amount of substance of reactive groups per mole of the polyrotaxane in conformity with a method for determining the number of the reaction points (reactive groups) instead of "JIS K 0070".

In an exemplary method for introducing a C4-C18 alkyl group into the cyclic molecule, a reactive group such as a hydroxy group in the cyclic molecule before introduction of the alkyl group is reacted with a compound having a functional group that is reactive with the reactive group and a C4-C18 alkyl group.

Examples of the compound having a functional group that is reactive with the reactive group and a C4-C18 alkyl group include alkyl isocyanates such as n-butyl isocyanate, t-butyl isocyanate, n-hexyl isocyanate, cyclohexyl isocyanate, n-octyl isocyanate, and octadecyl isocyanate.

The polyrotaxane preferably has a radical polymerizable group. The cyclic molecule may have a radical polymerizable group in addition to the C4-C18 alkyl group. The polyrotaxane having a radical polymerizable group allows the polyrotaxane-containing composition of the present invention to give a product after polymerization with better transparency.

In the case of introducing a radical polymerizable group into the cyclic molecule, the introduction rate thereof can be appropriately determined within a range that the sum of the introduction rate of a radical polymerizable group and the introduction rate of the C4-C18 alkyl group is 100%.

Examples of the radical polymerizable group include a (meth)acryloyl group, a vinyl group, and a maleimide group. Among these, preferred are a (meth) acryloyl group and/or a vinyl group, and more preferred is a (meth)acryloyl group because of its excellent radical polymerizability.

The "(meth)acryloyl group" as used herein refers to "acryloyl group" and "methacryloyl group."

The radical polymerizable group can be introduced by reacting a reactive group, such as a hydroxy group, in the cyclic molecule before introduction of the radical polymerizable group with a compound having a functional group reactive with the reactive group and a radical polymerizable group.

Examples of the compound having a functional group reactive with the reactive group and a radical polymerizable group include, in the case where a (meth)acryloyl group is introduced as a radical polymerizable group, (meth)acryloyl chloride, (meth)acrylic anhydride, 2-(meth)acryloyloxyethyl isocyanate, 2-hydroxyethyl (meth) acrylate, glycidyl (meth) acrylate, α-methacryloyloxy-γ-butyrolactone, and β-methacryloyloxy-γ-butyrolactone.

In the case where a vinyl group is introduced as a radical polymerizable group, the examples include p-vinyl benzoate, p-t-butylstyrene, 3-isopropenyl-α,α-dimethylbenzyl isocyanate, and vinyl chloroacetate.

In the case where a maleimide group is introduced as a radical polymerizable group, the examples include 3-maleimidopropionic acid, N-succinimidyl 3-maleimidopropionate, N-succinimidyl 4-maleimidobutyrate, and N-succinimidyl 6-maleimidohexanoate.

Preferred among these are (meth)acryloyl chloride, 2-(meth)acryloyloxyethyl isocyanate, glycidyl (meth)acrylate, 3-isopropenyl-α,α-dimethylbenzyl isocyanate, and vinyl chloroacetate because they are readily available and reacted easily.

The term "(meth)acryl" as used herein refers to "acryl" and "methacryl", and the term "(meth)acrylate" refers to "acrylate" and "methacrylate".

The inclusion rate refers to a ratio (in percentage) of the actual inclusion amount of the cyclic molecule relative to the maximum inclusion amount of the cyclic molecule when the linear molecule is included in the cyclic molecule. The lower limit of the inclusion rate is preferably 0.1%, whereas the upper limit thereof is 60%. The lower limit is more preferably 1% and the upper limit is more preferably 50%. The lower limit is still more preferably 5% and the upper limit is still more preferably 40%.

The maximum inclusion amount can be determined based on the length of the linear molecule and the thickness of the cyclic molecule. For example, the maximum inclusion amount in the case where the linear molecule is polyethylene glycol and the cyclic molecule is α-cyclodextrin has been experimentally calculated (see Macromolecules 1993, 26, 5698-5703).

The linear molecule is not particularly limited as long as it can be included in a cavity of the cyclic molecule in a skewered manner. Examples thereof include polyvinyl alcohol, polyvinyl pyrrolidone, poly(meth)acrylic acid, cellulose-based resins (e.g., carboxymethyl cellulose, hydroxyethyl cellulose, hydroxypropyl cellulose), polyacrylamide, polyethylene oxide, polyethylene glycol, polypropylene glycol, polyvinyl acetal-based resins, polyvinyl methyl ether, polyamine, polyethylene imine, casein, gelatin, starch and/or copolymers of these, polyolefin-based resins such as polyethylene, polypropylene, and copolymer resins with other olefin-based monomers, polyester resin, polyvinyl chloride resin, polystyrene-based resins such as polystyrene and acrylonitrile-styrene copolymers, acrylic resins such as polymethyl methacrylate, (meth)acrylic acid ester copolymers, and acrylonitrile-methyl acrylate copolymer resin, polycarbonate resin, polyurethane resin, vinyl chloride-vinyl acetate copolymer resin, polyvinyl butyral resin; and derivatives or modified products thereof, polyisobutylene, poly-tetrahydrofuran, polyaniline, acrylonitrile-butadiene-styrene copolymers (ABS resin), polyamides such as nylon, polyimides, polydienes such as polyisoprene and polybutadiene, polysiloxanes such as polydimethyl siloxane, polysulfones, polyimines, polyacetic anhydrides, polyureas, polysulfides, polyphosphazenes, polyketones, polyphenylenes, polyhaloolefins, and derivatives of these. Preferred among these are polyethylene glycol, polyisoprene, polyisobutylene, polybutadiene, polypropylene glycol, polytetrahydrofuran, polydimethyl siloxane, polyethylene, polypropylene, polyvinyl alcohol, and polyvinyl methyl ether. More preferred are polyethylene glycol, polypropylene glycol, polytetrahydrofuran, polydimethyl siloxane, polyethylene, and polypropylene. Still more preferred is polyethylene glycol.

The lower limit of the mass average molecular weight of the linear molecule is preferably 3000, whereas the upper limit thereof is preferably 300000. When the mass average molecular weight of the linear molecule is 3000 or more, the movement amount of the cyclic molecule along the linear molecule increases so that the resulting polyrotaxane-containing composition gives a cured substance with excellent stress relaxation properties. When the mass average molecular weight of the linear molecule is 300000 or less, the polyrotaxane shows still higher compatibility with the alkyl (meth)acrylate that has a C4-C18 alkyl group. The lower limit of the mass average molecular weight of the linear molecule is more preferably 5000 and the upper limit thereof is more preferably 100000. The lower limit is still more preferably 10000 and the upper limit is still more preferably 50000.

The mass average molecular weight of the linear molecule herein is a polyethylene glycol-equivalent value calculated based on the measurement by gel permeation chromatography (GPC). A column used for determination of a polyethylene glycol-equivalent mass average molecular weight by GPC is, for example, TSKgel SuperAWM-H (produced by Tosoh Corporation).

The mass average molecular weight of a molecule other than the linear molecule is a polystyrene-equivalent value calculated based on the measurement by GPC, unless otherwise specified. A column used for determination of a polystyrene-equivalent mass average molecular weight by GPC is, for example, TSKgel SuperHM-M (produced by Tosoh Corporation).

The polyrotaxane used in the polyrotaxane-containing composition of the present invention preferably has polyethylene glycol as a linear molecule and a molecule derived from α-cyclodextrin as a cyclic molecule.

The capping groups are placed at both ends of the linear molecule included in the cyclic molecule to prevent separation of the cyclic molecule. The method for capping both ends of the linear molecule with capping groups may be a conventionally known method (e.g., method disclosed in JP-A 2005-154675).

Examples of the capping groups include dinitrophenyl groups, cyclodextrins, adamantane groups, trityl groups, fluoresceins, silsesquioxanes, pyrenes, anthracenes, and main chains or side chains of polymers having a mass average molecular weight of 1000 to 1000000.

Preferred among these are dinitrophenyl groups, cyclodextrins, adamantane groups, trityl groups, fluoresceins, silsesquioxanes, and pyrenes. More preferred are adamantane groups and trityl groups.

Examples of the polymer having a mass average molecular weight of 1000 to 1000000 include polyamide, polyimide, polyurethane, polydimethyl siloxane, and polyacrylic ester.

Two or more kinds of these capping groups may be present together in the polyrotaxane.

The lower limit of the amount of the polyrotaxane relative to the whole polyrotaxane-containing composition of the present invention is preferably 0.2% by mass, whereas the upper limit thereof is preferably 30% by mass. When the amount of the polyrotaxane is 0.2% by mass or more, the polyrotaxane-containing composition of the present invention can give a cured substance with excellent strength. When the amount of the polyrotaxane is 30% by mass or less, the polyrotaxane-containing composition of the present invention can give a cured substance with excellent flexibility or elongation at break. The lower limit of the amount of the polyrotaxane relative to the whole polyrotaxane-containing composition of the present invention is more preferably 0.5% by mass, whereas the upper limit thereof is more preferably 20% by mass.

The polyrotaxane-containing composition of the present invention contains an alkyl (meth)acrylate that has a C4-C18 alkyl group. The polyrotaxane-containing composition of the present invention containing an alkyl (meth)acrylate that has a C4-C18 alkyl group is excellent in transparency and weather resistance and further exhibits favorable adhesiveness when used in a transparent pressure-sensitive adhesive, for example.

Examples of the C4-C18 alkyl group in the alkyl (meth) acrylate include a n-butyl group, a t-butyl group, a n-hexyl group, a cyclohexyl group, a n-octyl group, and an octadecyl group. In terms of the availability of raw materials, preferred are a n-butyl group, a n-hexyl group, and a n-octyl group.

Examples of the alkyl (meth)acrylate that has a C4-C18 alkyl group include n-butyl (meth)acrylate, sec-butyl (meth) acrylate, tert-butyl (meth) acrylate, 2-methylbutyl (meth) acrylate, 2-ethylbutyl (meth) acrylate, 3-methylbutyl (meth) acrylate, 1,3-dimethylbutyl (meth) acrylate, n-pentyl (meth) acrylate, n-hexyl (meth) acrylate, 2-ethylhexyl (meth)acrylate, n-heptyl (meth)acrylate, n-octyl (meth)acrylate, dodecyl (meth)acrylate, and octadecyl (meth)acrylate. Preferred among these are n-butyl (meth) acrylate, 2-ethylhexyl (meth) acrylate, dodecyl (meth)acrylate, and octadecyl (meth)acrylate in terms of transparency, availability, and economic efficiency.

These alkyl (meth) acrylates that has a C4-C18 alkyl group may be used alone, or in combination of two or more thereof.

The lower limit of the amount of the alkyl (meth) acrylate that has a C4-C18 alkyl group relative to the whole polyrotaxane-containing composition of the present invention is preferably 50% by mass. When the amount of the alkyl (meth)acrylate that has a C4-C18 alkyl group is 50% by mass or more, the resulting composition has excellent transparency. The lower limit of the amount of the alkyl (meth) acrylate that has a C4-C18 alkyl group is more preferably 60% by mass.

The upper limit of the amount of the alkyl (meth) acrylate that has a C4-C18 alkyl group relative to the whole polyrotaxane-containing composition of the present invention is preferably 99% by mass, more preferably 95% by mass in terms of the strength of the cured substance, for example.

The polyrotaxane-containing composition of the present invention preferably contains a radical polymerization initiator.

The polyrotaxane-containing composition of the present invention may contain, to the extent that the objects of the present invention are not impaired, a curing agent, a curing catalyst, a crosslinking agent, a coupling agent, a leveling agent, a lubricant, an antistatic agent, an antioxidant, alight stabilizer, a heat stabilizer, an anti-coloring agent, a metal deactivator, a flame retardant, a filler, a colorant, a photocatalyst material, a rust inhibitor, a water repellent agent, a conductive material, an anti-blocking agent, a softener, a mold release agent, a defoamer, a fluorescent brightener, a bluing agent, and a solvent.

The polyrotaxane-containing composition of the present invention is produced, for example, by stirring and dissolving the polyrotaxane, the alkyl (meth)acrylate that has a C4-C18 alkyl group, and additives added optionally in a container for stirring.

The polyrotaxane-containing composition of the present invention has excellent transparency, and therefore is suitably used as a raw material of a transparent pressure-sensitive adhesive, for example. The polyrotaxane-containing composition of the present invention is considered to be advantageous even in applications in which transparency is not required because functions of the polyrotaxane can be sufficiently exerted.

Advantageous Effects of Invention

The present invention can provide a polyrotaxane-containing composition having excellent transparency.

DESCRIPTION OF EMBODIMENTS

The present invention is more specifically described in the following with reference to, but not limited to, examples. The polyrotaxane used in preparation examples was prepared with reference to the method disclosed in Patent Literature 1.

PREPARATION EXAMPLE 1

An amount of 300 g of a 35% by mass xylene solution of polyrotaxane (inclusion rate of cyclic molecule: 25%, mass average molecular weight: 470000, hydroxy value: 74 mgKOH/g) having polyethylene glycol (mass average molecular weight: 35000) as a linear molecule, a-cyclodextrin (substitution degree of hydroxypropyl group: 51%) in which a hydroxypropyl group is introduced and then ε-caprolactone was graft-polymerized as a cyclic molecule, and adamantane amine groups as capping groups was prepared. The solution was blended with 4.17 g of n-butyl isocyanate and stirred at 25° C. for 30 minutes, warmed to 60° C., and reacted at that temperature for four hours. The obtained reaction solution was cooled to 25° C., added to a large amount of methanol and stirred, and subjected to centrifugation for recovery of a precipitate. The obtained precipitate was dissolved in a large amount of acetone, added to a large amount of methanol and stirred to be precipitated again, and centrifuged for recovery of the precipitate. The obtained precipitate was dried to give 104.7 g of polyrotaxane (PR-1) in which an n-butyl group was introduced into the cyclic molecule. The introduction rate of the n-butyl group in the polyrotaxane (PR-1) was 29%.

PREPARATION EXAMPLE 2

An amount of 107.5 g of polyrotaxane (PR-2) in which an n-butyl group was introduced into a cyclic molecule was prepared in the same manner as in Preparation Example 1, except that the amount of n-butyl isocyanate was changed to 6.94 g. The introduction rate of the n-butyl group in the polyrotaxane (PR-2) was 48%.

PREPARATION EXAMPLE 3

An amount of 112.3 g of polyrotaxane (PR-3) in which an n-butyl group was introduced into a cyclic molecule was prepared in the same manner as in Preparation Example 1, except that the amount of n-butyl isocyanate was changed to 9.72 g. The introduction rate of the n-butyl group in the polyrotaxane (PR-3) was 70%.

PREPARATION EXAMPLE 4

An amount of 111.5 g of polyrotaxane (PR-4) in which an n-hexyl group was introduced into a cyclic molecule was prepared in the same manner as in Preparation Example 1, except that 4.17 g of n-butyl isocyanate was changed to 8.90 g of n-hexyl isocyanate. The introduction rate of the n-hexyl group in the polyrotaxane (PR-4) was 49%.

PREPARATION EXAMPLE 5

An amount of 112.2 g of polyrotaxane (PR-5) in which an n-octyl group was introduced into a cyclic molecule was prepared in the same manner as in Preparation Example 1, except that 4.17 g of n-butyl isocyanate was changed to 10.9 g of n-octyl isocyanate. The introduction rate of the n-octyl group in the polyrotaxane (PR-5) was 47%.

PREPARATION EXAMPLE 6

Part of the reaction solution obtained in Preparation Example 2 was taken out, purified using methanol and acetone in the same manner as in Preparation Example 2, and dried. The resulting polyrotaxane had an introduction rate of an n-butyl group of 48%. The remaining reaction solution was blended with 50 mg of dibutylhydroxytoluene and stirred at 25° C. for 15 minutes for dissolution of dibutylhydroxytoluene. The resulting solution was then blended with 10.5 g of 2-methacryloyloxyethyl isocyanate, stirred at 25° C. for 30 minutes, warmed to 60° C., and reacted at that temperature for four hours. The resulting reaction solution was cooled to 25° C., added to a large amount of methanol and stirred, and subjected to centrifugation for recovery of a precipitate. The obtained precipitate was dissolved in a large amount of acetone, added to a large amount of methanol and stirred to be precipitated again, and subjected to centrifugation for recovery of the precipitate. The obtained precipitate was dried to give 115.3 g of polyrotaxane (PR-6) in which an n-butyl group and a methacryloyl group were introduced into a cyclic molecule. The introduction rate of the n-butyl group in the polyrotaxane (PR-6) was 48% as mentioned above and the introduction rate of the methacryloyl group therein was 51%.

PREPARATION EXAMPLE 7

An amount of 115.7 g of polyrotaxane (PR-7) in which an n-hexyl group and a methacryloyl group were introduced into a cyclic molecule was prepared in the same manner as in Preparation Example 6, except that part of the reaction solution obtained in Preparation Example 4 was used instead of the part of the reaction solution obtained in Preparation Example 2. The introduction rate of the n-hexyl group in the polyrotaxane (PR-7) was 49% and the introduction rate of the methacryloyl group therein was 49%.

PREPARATION EXAMPLE 8

An amount of 119.5 g of polyrotaxane (PR-8) in which an n-octyl group and an acryloyl group were introduced into a cyclic molecule was prepared in the same manner as in Preparation Example 6, except that part of the reaction solution obtained in Preparation Example 5 was used instead of the part of the reaction solution obtained in Preparation Example 2 and that 9.87 g of 2-acryloyloxyethyl isocyanate was used instead of 10.5 g of 2-methacryloyloxyethyl isocyanate. The introduction rate of the n-octyl group in the polyrotaxane (PR-8) was 47% and the introduction rate of the acryloyl group therein was 48%.

PREPARATION EXAMPLE 9

An amount of 300 g of a 35% by mass xylene solution of polyrotaxane (inclusion rate of cyclic molecule: 25%, mass average molecular weight: 470000, hydroxy value: 74 mgKOH/g) having polyethylene glycol (mass average molecular weight: 35000) as a linear molecule, α-cyclodextrin (substitution degree of hydroxypropyl group: 51%) in which a hydroxypropyl group is introduced and then ε-caprolactone was graft-polymerized as a cyclic molecule, and adamantane amine groups as capping groups was prepared. The solution was added to a large amount of methanol, stirred, and subjected to centrifugation for recovery of a precipitate. The obtained precipitate was dissolved in a large amount of acetone, added to a large amount of methanol and stirred to be precipitated again, and subjected to centrifugation for recovery of the precipitate. The obtained precipitate was dried to give 99.8 g of polyrotaxane (PR-9) in which no C4-C18 alkyl group was introduced into the cyclic molecule.

PREPARATION EXAMPLE 10

An amount of 300 g of a 35% by mass xylene solution of polyrotaxane (inclusion rate of cyclic molecule: 25%, mass average molecular weight: 470000, hydroxy value: 74 mgKOH/g) having polyethylene glycol (mass average molecular weight: 35000) as a linear molecule, α-cyclodextrin (substitution degree of hydroxypropyl group: 51%) in which a hydroxypropyl group is introduced and then ε-caprolactone was graft-polymerized as a cyclic molecule, and adamantane amine groups as capping groups was prepared. The solution was blended with 50 mg of dibutylhydroxytoluene and stirred at 25° C. for 15 minutes so that dibutylhydroxytoluene was dissolved. Then, the resulting solution was blended with 10.5 g of 2-methacryloyloxyethyl isocyanate, stirred at 25° C. for 30 minutes, warmed to 60° C., and reacted at that temperature for four hours. The obtained reaction solution was cooled to 25° C., added to a large amount of methanol and stirred, and subjected to centrifugation for recovery of a precipitate. The obtained precipitate was dissolved in a large amount of acetone, added to a large amount of methanol and stirred to be precipitated again, and subjected to centrifugation for recovery of the precipitate. The obtained precipitate was dried to give 113.4 g of polyrotaxane (PR-10) in which no C4-C18 alkyl group was introduced but a methacryloyl group was introduced into the cyclic molecule. The introduction rate of the methacryloyl group in the polyrotaxane (PR-10) was 50%.

PREPARATION EXAMPLE 11

An amount of 116.5 g of polyrotaxane (PR-11) in which no C4-C18 alkyl group was introduced but a methacryloyl group was introduced into a cyclic molecule was prepared in the same manner as in Example 10, except that the amount of 2-methacryloyloxyethyl isocyanate was set to 15.2 g. The introduction rate of the methacryloyl group in the polyrotaxane (PR-11) was 71%.

EXAMPLES 1 to 15, COMPARATIVE EXAMPLES 1 to 5

A 30-mL sample bottle equipped with a stirring element was charged with the materials each in an amount shown in Table 1, and the contents were stirred at 25° C. for one hour.

In Table 1, "2-EHA" refers to 2-ethylhexyl acrylate (produced by Tokyo Chemical Industry Co., Ltd.), "BA" refers to n-butyl acrylate (produced by Tokyo Chemical Industry Co., Ltd.), and "LA" refers to dodecyl acrylate (produced by Tokyo Chemical Industry Co., Ltd.).

<Evaluation>

Each of the polyrotaxane-containing compositions obtained in the examples and comparative examples was subjected to the following evaluation. Table 1 shows the results.

(Transparency)

Each of the polyrotaxane-containing compositions obtained in the examples and comparative examples was visually observed at 25° C. and 40° C. The transparency was evaluated based on the following criteria: A composition with no turbidity at 25° C. and 40° C. was regarded to be "excellent (oo)"; A composition with slight turbidity at 25° C. but no turbidity at 40° C. was regarded to be "fair (o)"; A composition with turbidity or separation at both 25° C. and 40° C. was regarded to be "poor (x)".

TABLE 1

| | | Polyrotaxane | | C4-C18 Alkyl (meth)acrylate | | | | | |
|---|---|---|---|---|---|---|---|---|---|
| | Kind | Introduction rate of each group in cyclic molecule | Amount (g) | Amount (g) of 2-EHA | Amount (g) of BA | Amount (g) of LA | Amount (wt %) of polyrotaxane | Amount (wt %) of C4-C18 alkyl (meth)acrylate | Transparency |
| Example 1 | PR-1 | n-Butyl: 29% | 9.00 | 21.00 | — | — | 30 | 70 | o |
| Example 2 | PR-2 | n-Butyl: 48% | 9.00 | 21.00 | — | — | 30 | 70 | oo |
| Example 3 | PR-3 | n-Butyl: 70% | 9.00 | 21.00 | — | — | 30 | 70 | oo |
| Example 4 | PR-4 | n-Hexyl: 49% | 9.00 | 21.00 | — | — | 30 | 70 | oo |
| Example 5 | PR-5 | n-Octyl: 47% | 9.00 | 21.00 | — | — | 30 | 70 | oo |
| Example 6 | PR-6 | n-Butyl: 48% Methacryloyl: 51% | 9.00 | 21.00 | — | — | 30 | 70 | oo |
| Example 7 | PR-2 | n-Butyl: 48% | 9.00 | — | 21.00 | — | 30 | 70 | oo |
| Example 8 | PR-4 | n-Hexyl: 49% | 9.00 | — | 21.00 | — | 30 | 70 | oo |
| Example 9 | PR-5 | n-Octyl: 47% | 9.00 | — | 21.00 | — | 30 | 70 | oo |
| Example 10 | PR-3 | n-Butyl: 70% | 9.00 | — | — | 21.00 | 30 | 70 | o |
| Example 11 | PR-2 | n-Butyl: 48% | 3.00 | 27.00 | — | — | 10 | 90 | o |
| Example 12 | PR-5 | n-Octyl: 47% | 3.00 | 27.00 | — | — | 10 | 90 | oo |
| Example 13 | PR-6 | n-Butyl: 48% Methacryloyl: 51% | 6.00 | 12.00 | 12.00 | — | 20 | 80 | oo |
| Example 14 | PR-7 | n-Hexyl: 49% Methacryloyl: 49% | 6.00 | — | 12.00 | 12.00 | 20 | 80 | oo |
| Example 15 | PR-8 | n-Octyl: 47% Acryloyl: 48% | 6.00 | 8.00 | 8.00 | 8.00 | 20 | 80 | oo |
| Comparative Example 1 | PR-9 | — | 9.00 | 21.00 | — | — | 30 | 70 | x |
| Comparative Example 2 | PR-9 | — | 3.00 | 27.00 | — | — | 10 | 90 | x |
| Comparative Example 3 | PR-10 | Methacryloyl: 50% | 9.00 | 21.00 | — | — | 30 | 70 | x |
| Comparative Example 4 | PR-10 | Methacryloyl: 50% | 3.00 | 27.00 | — | — | 10 | 90 | x |
| Comparative Example 5 | PR-11 | Methacryloyl: 71% | 9.00 | 21.00 | — | — | 30 | 70 | x |

In the case of the polyrotaxanes having no C4-C18 alkyl group in the cyclic molecule as used in Comparative Examples 1 to 5, they each had poor compatibility with an alkyl (meth)acrylate that has a C4-C18 alkyl group so that the composition exhibited turbidity or separation. In contrast, in the case of the polyrotaxanes having a C4-C18 alkyl group in the cyclic molecule as used in Examples 1 to 15, they each had favorable compatibility with an alkyl (meth)acrylate that has a C4-C18 alkyl group to give a transparent composition.

INDUSTRIAL APPLICABILITY

The present invention can provide a polyrotaxane-containing composition having excellent transparency.

The invention claimed is:

1. A polyrotaxane-containing composition comprising:
    a polyrotaxane that has a cyclic molecule, a linear molecule threading through a cavity of the cyclic molecule in a skewered manner, and capping groups capping both ends of the linear molecule; and
    an alkyl (meth)acrylate that has a C4-C18 alkyl group, wherein the cyclic molecule is a cyclodextrin,
    the polyrotaxane has at least one cyclic molecule that has a C4-C18 alkyl group, a radical polymerizable group, and a solubility-imparting group,
    the solubility-imparting group is a polyester chain, and
    the C4-C18 alkyl group of the polyrotaxane is introduced to a terminal reaction point of the polyester chain by reacting a hydroxy group of the polyester chain with an alkyl isocyanate, wherein the alkyl isocyanate has an isocyanate group and the C4-C18 alkyl group, and the isocyanate group is reactive with the hydroxy group.

2. The polyrotaxane-containing composition according to claim 1, wherein the amount of the alkyl (meth)acrylate that has the C4-C18 alkyl group is 50% by mass or more.

3. The polyrotaxane-containing composition according to claim 1, wherein the alkyl isocyanate consists of the isocyanate group and the C4-C18 alkyl group.

* * * * *